United States Patent
Roberts, Jr.

[11] 3,879,794
[45] Apr. 29, 1975

[54] WINDSHIELD WIPER BLADE ASSEMBLY
[75] Inventor: Hobart V. Roberts, Jr., Elma, N.Y.
[73] Assignee: Trico Products Corporation, Buffalo, N.Y.
[22] Filed: Feb. 22, 1974
[21] Appl. No.: 444,862

[52] U.S. Cl. ............................................ 15/250.42
[51] Int. Cl. .......................... B60s 1/04; B60s 1/38
[58] Field of Search ..................... 15/250.36, 250.42

[56] References Cited
UNITED STATES PATENTS

| | | | |
|---|---|---|---|
| 3,121,903 | 2/1964 | Ludwig | 15/250.42 |
| 3,153,254 | 10/1964 | Lenz et al. | 15/250.42 |
| 3,427,637 | 2/1969 | Quinlan et al. | 15/250.42 |
| 3,626,544 | 12/1971 | Lopez et al. | 15/250.42 |
| 3,820,188 | 6/1974 | Moorhead et al. | 15/250.42 |

*Primary Examiner*—Peter Feldman
*Attorney, Agent, or Firm*—E. Herbert Liss

[57] ABSTRACT

A replaceable squeegee assembly or refill unit for a windshield wiper blade incorporates a multi-use backing strip for supporting a rubber-like squeegee element. The backing strip may be integrally formed of molded or extruded plastic material. A pair of squeegee holders, each in the form of a channel-shaped body having inwardly extending opposed flanges at the outer ends of the legs of the channel, are arranged in back-to-back relationship and include a common web portion. A pair of elongate side rails extending longitudinally for the entire length of the channel bodies extending laterally outwardly are provided on the legs of the channel bodies. The side rails associated with each channel body are coplanar; the distance between the longitudinal edges of one pair of side rails is greater than the distance between the longitudinal edges of the other pair of side rails. The differences in the overall lateral width of the pairs of side rails permit use of the backing strip in different superstructures having pairs of opposed claws for slidably receiving the side rails which are spaced apart different distances. The squeegee element may be slidably received in either of the squeegee holders while the side rails on the unused squeegee holder are received between the claws of the superstructure. A clip which interlocks with the backing strip adjacent the end thereof serves to retain the squeegee element within the squeegee holder and also serves to limit the longitudinal displacement of the refill unit relative to the superstructure.

14 Claims, 8 Drawing Figures

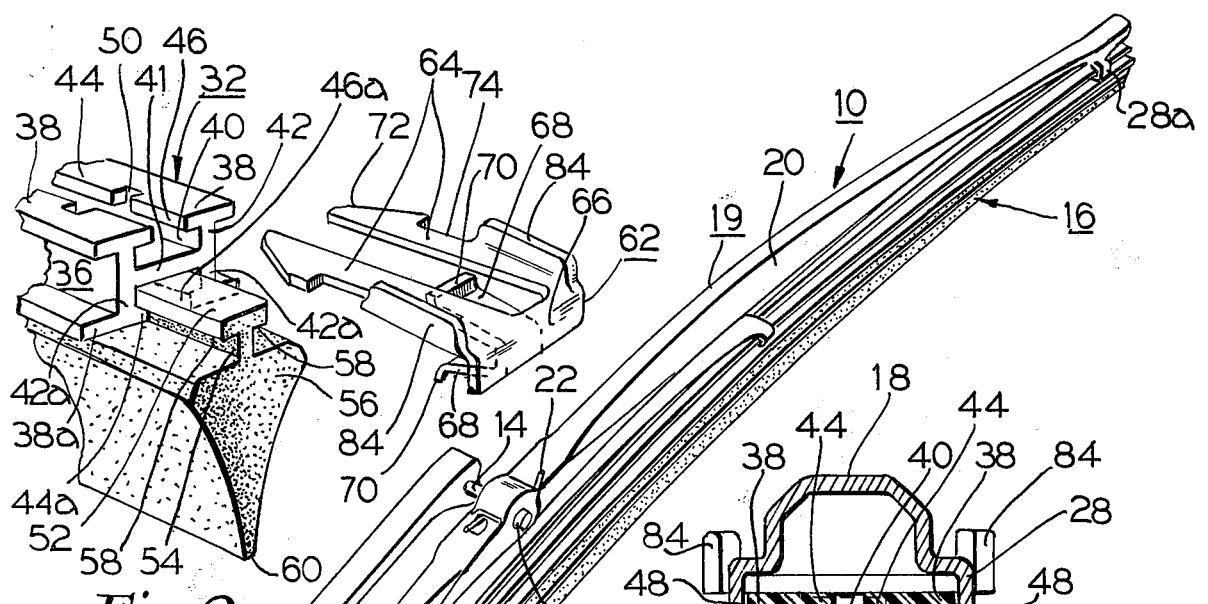

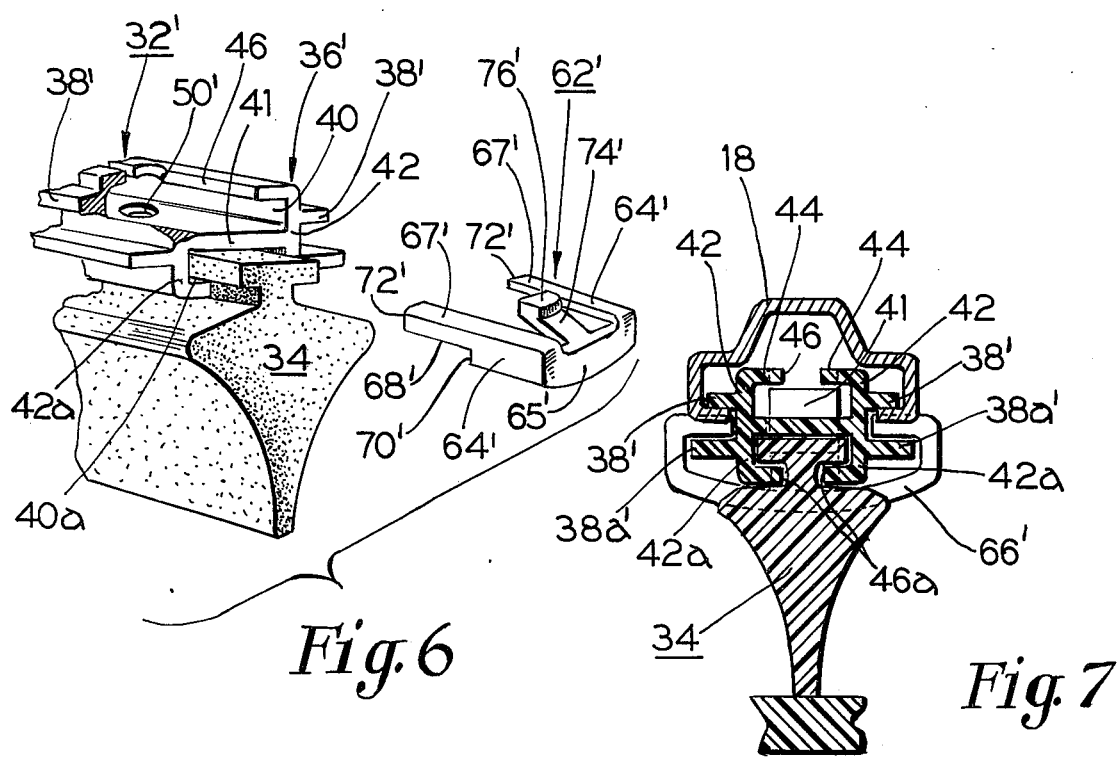
Fig. 6
Fig. 7
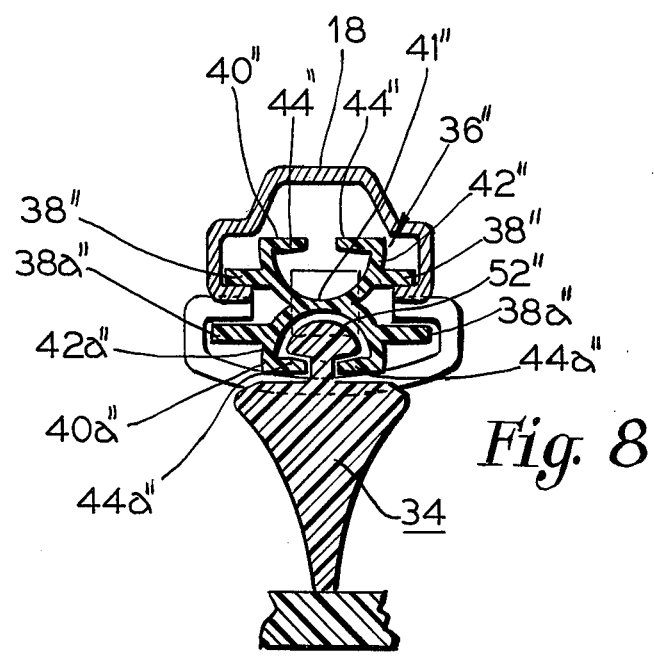
Fig. 8

3,879,794

WINDSHIELD WIPER BLADE ASSEMBLY

BACKGROUND OF THE INVENTION

The present invention relates to replaceable refill units for wiper blades and more particularly to an adjustable and universally usable backing strip for a refill unit.

Current wiper blade assemblies for both original equipment and replacement blades include flexible pressure distributing super-structures comprising a plurality of articulated levers having pairs of opposed blade straddling claws to slidably retain a replaceable wiping assembly or refill unit including an elastomeric squeegee element and backing strip or support therefor. Blade straddling claws or superstructures of different sizes, different designs and blades made by different manufacturers vary in width rendering it difficult and in some cases impossible to provide a suitable universal replaceable wiping assembly or refill unit. In attempts to overcome this problem refill units have been supplied together with a sizing guage and directions to spread or compress the blade straddling claws with the aid of the sizing gauge. In seeking to provide a universal refill, backing strips have been made in comprised widths which are not wide enough to properly fit the widest claws and so wide as to fit to sungly in the narrowest claws. Resilient clips such as that shown in U.S. Pat. No. 3,153,254 by E. W. Lenz et al., issued Oct. 20, 1964, which interlock with the backing strip and resiliently engage the claws of the superstructure have been used successfully to provide universal refills in a limited range of blade widths. Another scheme to provide a universal refill element utilizes two separate unattached side rails receivable in longitudinal grooves of the elastomeric element. The rails are held together by clamps or staples. These do not provide the support for the squeegee necessary to produce a clean wipe and furthermore are awkward to assemble.

Application Ser. No. 441,506, filed Feb. 11, 1974, by R. A. Diebel, et al., discloses a different construction for providing a universal refill unit wherein the side rails which are embraced by the blade straddling claws are resiliently attached to the squeegee holder by flexible legs to that they can be flexed toward and away from each other to accomodate claws spaced apart different distances.

SUMMARY OF THE INVENTION

According to the present invention a backing strip is provided which may be preferably of molded or extruded plastic and which includes a pair of squeegee holders arranged back-to-back, each in the form of a channel body, for receiving the longitudinal anchoring bead of an elastomeric wiping element. A pair of coplanar side rails are attached to the channel body, one on each leg thereof, extending laterally outwardly. The outer longitudinal edges of one pair of co-planar side rails is spaced apart a greater distance than the outer longitudinal edges of the other pair of coplanar side rails. For blade superstructures having a relatively wider width between the blade straddling claws the first-mentioned pair of side rails can be inserted, and for superstructures having a relatively narrow width between the claws the last-mentioned pair of side rails are receivable between the opposed blade straddling claws. Accordingly, the squeegee element can be inserted in the channel body or squeegee holder associated with the side rails not being used for insertion between the blade straddling claws of the superstructure. In either case there is sufficient sliding relationship without excessive looseness between the claws and the backing strip to permit conformance of the blade to a curved windshield. The present invention provides an advantage over the aforementioned application Ser. No. 441,506 in that it can be more precisely fitted to different specific superstructures with clearance to permit more freedom and slidability while the aforementioned application Ser. No. 441,506 permits use in a variety of superstructures having a broader range of claw widths.

It is the principal object of the present invention to provide a refill unit for windshield wiper blades having an improved backing strip for use in a variety of superstructures having pairs of claws spaced apart various widths which is simple in construction and economical to manufacture.

Another object of the invention is to provide an improved refill unit for windshield wiper blades incorporating a backing strip adapted for use in a variety of superstructures having pairs of claws spaced apart various widths which can be readily removed and replaced without the use of tools and which provides suitable clearance for proper slidability in the claws of the superstructure.

Other objects and advantages of the invention will be apparent from the following detailed description taken in connection with the accompanying drawings.

DESCRIPTION OF THE DRAWINGS

FIG. 1 is a perspective view of the invention incorporated in a windshield wiper blade assembly;

FIG. 2 is a partial perspective exploded view of the refill unit of the invention;

FIG. 3 is a lateral cross section taken on line III—III of FIG. 1, looking in the direction of the arrows;

FIG. 4 is a top elevational view of the refill unit of the invention;

FIG. 5 is a side elevational view;

FIG. 6 is a partially exploded perspective view of a preferred embodiment of the invention;

FIG. 7 is a lateral cross section similar to FIG. 3 illustrating the embodiment of FIG. 6; and FIG. 8 is a lateral cross section of another embodiment of the invention;

DETAILED DESCRIPTION

In FIG. 1 through 5 there is shown a wiper arm and blade assembly 10 which includes a wiper arm 12 having means at one end (not shown) for securing it to an oscillatable pivot shaft and a blade attachment pin 14 at its outer end. It will of course be understood that superstructures having any suitable type of blade to arm connection may be employed. The wiper blade assembly 16 includes a superstructure 19 comprising primary levers 18 and 20 pivotally secured together at their inner ends and biased to conformance with a windshield by a coil spring 22. A secondary lever or yoke 24 is pivoted to its center to the axis between levers 18 and 20. A latching receptor is provided at 26 to pivotally receive the pin 14 in releasable latching engagement. The levers 18 and 20 have pairs of opposed blade straddling claws 28 and 28a respectively formed at their outer ends. The claws are substantially U-shaped in cross section. Similar pairs of claws 30 are provided at each end of the secondary lever or yoke 24. Although the invention is illustrated and described for use in a specific super-structure, it will of course be understood that other and different types of superstructures may be used with the invention. For example, the pairs of claws 28, 28a, 30 are shown with their openings directly opposite each other. Superstructures having the pairs of claws slightly staggered are intended to be included in the term "opposed" with reference to the pairs of opposed blade straddling claws.

A wiping assembly or refill unit 32 comprising an elastomeric or rubber-like wiping element or squeegee 34 and a backing strip or support 36 for the wiping element is slidably received and retained between the pairs of opposed claws 28, 28a and 30 of the superstructure 19. The backing strip 36 includes a pair of elongate channel bodies or squeegee holders 40 and 40a arranged in back-to-back relationship, the channel bodies 40 and 40a including common web 41. A pair of elongate legs 42 extend perpendicularly from the web 41 in one direction terminating with inwardly directed flanges 44; a pair of legs 42a extend perpendicularly from the web 41 in the opposite direction terminating with inwardly directed flanges 44a. The flanges 44 and 44a provide opposed edges 46 and 46a. The web 41, legs 42 and flanges 44 define an elongate slot and form one squeegee holder or channel body; web 41, legs 42a and flanges 44a define another slot and form the other squeegee holder or channel body 40a. At the free ends of the legs 42 and 42a there are provided pairs of side rails 38 and 38a, respectively, extending laterally outwardly from the legs 42 and 42a respectively. The distance between the outer longitudinal edges 48 of side rails 38 are spaced apart a smaller distance than the outer longitudinal edges 48a of side rails 38a. The flanges 44 and 44a are notched as at 50 and 50a, respectively, adjacent each end for a purpose hereinafter explained. The backing strip 36 may be preferably integrally formed of plastic material, molded or extruded as illustrated by way of example, but it will be understood that in accordance with the broader aspects of the invention any other suitable or desirable flexible, resilient material may be used and the backing strip may be formed by any suitable or desirable method. It can thus be seen that a backing strip or support 36 has been provided which has less flexibility in a plane parallel to the surface to be wiped than in a direction perpendicular thereto and in which two pairs of co-planar spaced apart side rails 38, 38a are provided which can accomodate superstructures in different ranges of widths between pairs of opposed claws. Either pair of side rails 38, 38a may, alternatively, be inserted between pairs of claws 28, 28a, and 30 depending on the distance between the opposed claws. Superstructures having opposed claws spaced a relatively greater distance apart would receive side rails 38a and those superstructures having claws spaced a relatively lesser distance apart would receive side rails 38.

The wiping element or squeegee 34 comprises an elongate strip of elastomeric or rubber-like material and may be formed in any of the well known shapes commonly employed. The squeegee element shown in the example for purposes of illustration includes an anchoring bead 52 extending along one longitudinal edge connected by a reduced neck portion 54 to a body portion 56. The anchoring bead 52 at its junction with the neck portion 54 forms downwardly facing shoulders 58. Along the opposite longitudinal edge is a wiping lip 60. The body portion is generally triangularly shaped in cross section, the wiping lip forming the apex of the triangle. It whould be noted that although a squeegee element with a single neck between the anchoring bead and the body portion is illustrated and described, elements having a pair of lateral shoulders intermediate the anchoring bead and the body portion forming a second neck hinging the body portion to the shoulder may also be used. The anchoring bead 52 is slidably received within the channel body 40 or 40a, depending upon the dimensions of the superstructure with which the refill unit is to be used. It is retained therein by engagement of the shoulders 58 with the flanges 44 or the flanges 44a. The combination of backing strip 36 and squeegee element 34 constitutes a multi-use refill unit.

A clip 62 which may be of plastic material or other suitable resilient material is provided to retain the squeegee element 34 against longitudinal displacement and to limit the longitudinal displacement of the refill unit 32 relative to the superstructure 16. The clip 62 is of substantially U-shaped configuration comprising a pair of legs 64, flexibly and resiliently connected together by a web 66, having a pair of tabs 68 extending inwardly therefrom. The tabs 68 terminate in lugs 70 extending in opposite directions. The legs 64 are tapered at their free ends as at 72 for camming engagement with claws 28. The legs include notches 74 having opposed shoulders which extend laterally beyond the outer longitudinal edges of the backing strip so as to resiliently engage the claws and restrain the wiping element from excessive longitudinal displacement in either direction by engagement of the web of the U-shaped claws 28 with the opposed shoulders when in assembled condition. The clip 62 is disposed with its legs 64 overlying either rails 38 or rails 38a with tabs 68 straddling web 41. The tabs 68 are resiliently biased in opposite directions and, when inserted, lugs 70 resiliently engage the notches 50 adjacent the end of the backing strip 36. One of the tabs 68 and its lug 70 which lies within the channel wherein the squeegee element 34 is disposed forms a depending abutment to restrain the squeegee element 34 against longitudinal displacement. A simplified clip 76 may be employed which functions only to restrain the squeegee element from longitudinal displacement. The clip 76 is of U-shaped configuration and it includes a web 78 and tabs 80 with lugs 82 extending in opposite directions at the free ends of the tabs 80. The tabs 80 are biased in opposite directions and are inserted at the end of the backing strip straddling the web 41 whereby the lugs 82 engage the notches 50 adjacent the end of the backing strip. The tab 80 and lug 82 lying within the channel body 40 or 40a, whichever is occupied by the squeegee element 34, serves as a depending abutment to restrain the squeegee element 34 against longitudinal displacement relative to the backing strip 36.

The refill unit 32 is assembled by sliding the anchoring bead 52 into the channel body 40 or the channel body 40a, depending on whether wide or narrow spaced claws are utilized on the superstructure with which the refill unit is to be used, whereupon the tabs 68 are positioned to straddle the end of web 41 of the backing strip 36; the clip is slid forward until the lugs 70 engage the notches 50; the clip 76 is then inserted at the other end with the legs 80 straddling the end of the web 41 and slid inwardly until the lugs 82 engage the other notches 50; in the specific embodiment herein illustrated the clips 62 and 76 may constitute an element of the multi-use replaceable refill unit. It should be understood, however, that in accordance with the broader aspects of the invention other and different means may be employed for retaining the unit in assembled relationship.

To insert the refill unit 32 into the superstructure the side rails 38 or 38a, again depending on the distance between the opposed claws of the superstructure, are slid through the opposed pairs of claws 28, 28a and 30. The tapered surfaces 72 of the clip 62 engage the claws 28, compressing the legs 64 until the notch 74 reaches the web portion of the pair of opposed claws 28 at which time the resilience of the legs 64 of the clip 62 causes the notches 74 to interlock with the web of the pair of opposed claws 28. Removal of the refill unit 32 is accomplished by manually grasping a pair of flanges 84 at the side edges of the legs 64 and compressing the legs 64 to effect disengagement of the notches 74 from the webs of the pair of claws 28, whereupon the refill unit can readily be withdrawn from the superstructure.

Another preferred embodiment of the invention is illustrated in FIGS. 6 and 7. In this modified embodiment parts which are identical with the embodiment shown in FIGS. 1 to 5 will be identified with the same reference numerals. Backing strip 36' of refill unit 32' comprises a pair of channel bodies or squeegee holders 40 and 40a. Channel body 40a includes web 41, legs 42 perpendicular to web 41, the flanges 44 extending inwardly from the free ends of legs 42 having opposed edges 46. Channel body 40a includes web 41, legs 42a extending perpendicularly to web 41 in a direction opposite from legs 42 and flanges 44a extending laterally inwardly from the free ends of legs 42a and include opposed edges 46a. Extending longitudinally along and laterally outwardly of each leg 42 is a side rail 38'. The side rails 38' are co-planar and located intermediate the web 41 and the free end of legs 42. Disposed longitudinally along and extending laterally outwardly of each of legs 42a is a side rail 38a'. The side rails 38a' are co-planar and are located intermediate the web 41 and the free ends of legs 42a. The distance between the outer longitudinal edges of the side rails 38' is smaller than the distance between the outer edges of the side rails 38a'. Each end of web 41 is apertured as at 50'. A clip 62' is provided at each end of the refill unit 32' to retain the squeegee element 34 from longitudinal displacement relative to the backing strip 36' and for limiting longitudinal displacement of the refill unit 32' relative to a superstructure in which it is installed. The clip 62' is in the form of a channel having a web 66' and side walls or legs 64' which terminate in inwardly directed flanges 67'; the channel is closed at one end by an end wall 65'. The web 66' is cut away adjacent the open end of the channel as at 68' to form a depending abutment 70'. The ends of the legs 64' at the open end of the channel form shoulders 72'. A tongue 74' having a lug 76' extending inwardly from the end wall 65'. The clip is received at the end of the backing strip on the side rails with the flanges 67' overlying the lowermost pair of side rails 38' or 38a' and the web 66' underlying the corresponding channel body 40 or 40a, whichever contains the squeegee element 34. The tongue 74' is positioned below the web 41 and the lug 76' engages the aperture 50' in the web 41. Clip 62' may be used at each end of the backing strip. When the refill unit 32' is assembled in the superstructure the claws 28 engage the shoulders 72' of the clip to limit longitudinal movement of the refill unit relative to the superstructure and the abutment 70' engages the end of the squeegee element 34 to restrain it against longitudinal movement relative to the backing strip 36'. In the embodiment illustrated in FIGS. 6 and 7 a lower profile is achieved by arranging the side rails spaced a distance from the free end of the legs of the channel body which for certain applications may be preferable.

Another embodiment of the invention is shown in FIG. 8. In this embodiment the backing strip 36" comprises a pair of channel bodies 40" and 40a" arranged in back-to-back relationship having inwardly directed flanges 44" and 44a" respectively at the free ends of the semicircular channel wall 42" and 42a". A common channel wall section 41" is formed at the junction between the channel bodies 40" and 40a".

A pair of co-planar side rails 38" extend longitudinally along and laterally outwardly from the wall 42" intermediate the wall section 41" and the flanges 44". A pair of co-planar side rails 38a" extend longitudinally along and laterally outwardly from opposite sides of the wall 42a" intermediate the common wall section 41" and the flanges 44a". A squeegee element 34" may be utilized having an anchoring bead 52" with a semicircular periphery in cross section. It will of course be understood that the modifications shown in FIGS. 1 through 5 and FIGS. 6 and 7 may also be of such dimensions as to accomodate a squeegee element such as 34". Clips designed similar to the clips 62 and 62' may be used interchangeably and in any of the modifications; the clip 76 may be used at one end with the clip 62 at the other end.

An improved refill unit having a unique backing strip which permits accomodation to a multiplicity of types and sizes of wiper blade superstructures and which can be formed of molded or extruded plastic as well as from other suitable resilient, flexible materials has been shown and described in a specific wiper blade construction. Thus there have been provided a multi-use refill unit which is readily removable and replaceable without the use of tools or other devices and which is simple and economical to manufacture.

Although certain specific embodiments of the invention have been shown and described for the purposes of illustration it will be apparent that in accordance with the broader aspects of the invention various modifications and other embodiments are possible within the scope of the invention. For example, other and different types of latching arrangements for retaining the refill unit in the superstructure may be employed, other and different types of materials may be used either for the squeegee element or the backing strip, and the refill unit may be employed with other and different types of superstructures. Furthermore, other and different means may be employed to retain the squeegee element within the channel of the backing strip, and other and different types of squeegee elements may be employed. It is, therefore, to be understood that the invention is not limited to the specific arrangements shown but in its broadest aspects it includes all equivalent embodiments and modifications which come within the scope of the invention.

What is claimed is:

1. For use in a windshield wiper blade assembly including an elongate flexible pressure distributing superstructure having a plurality of pairs of laterally spaced apart opposed blade straddling claws and an elongate replaceable refill unit comprising an elongate squeegee element of elastomeric material and a flexible resilient backing strip supporting said squeegee element, the backing strip having less flexibility in a plane parallel to the surface to be wiped than in directions perpendicular thereto; said backing strip comprising a pair of elongate channel bodies disposed back to back having elongate slots for receiving and retaining a squeegee element, a first pair and a second pair of co-planar elongate side rails disposed for slidable engagement in said pairs of opposed blade straddling claws, each side rail of said first pair extending longitudinally along and laterally outwardly of one leg of one of said pairs of channel bodies, each side rail of said second pair extending longitudinally along and outwardly of one leg of the other of said pair of channel bodies, the distance between the outer longitudinal edges of said first pair of rails being different from the distance between the outer longitudinal edges of said second pair of rails whereby said backing strip is adapted to accomodate different wiper blade superstructures having opposed pairs of claws spaced apart different distances.

2. A backing strip according to claim 1 wherein the slots of the channel bodies are T-shaped in cross section for receiving a squeegee element having a shouldered anchoring bead along one longitudinal edge.

3. A backing strip according to claim 1 wherein the pair of channel bodies have a common web at their junction.

4. A backing strip according to claim 1 wherein said side rails are disposed on the legs of the channel bodies intermediate the web and free end thereof.

5. A backing strip according to claim 1 wherein said side rails are disposed at the free ends of the legs of the channel bodies.

6. A backing strip according to claim 1 wherein said channel bodies are semicircular in cross section and include inwardly projecting longitudinal flanges at the ends of the legs thereof for retaining a squeegee element having a shouldered anchoring bead along one longitudinal edge.

7. A backing strip according to claim 1 of integrally formed plastic material.

8. A refill unit for a wiper blade assembly comprising an elongate squeegee element of elastomeric material, an integrally formed backing strip of plastic material for supporting said squeegee element and means for retaining said squeegee element in assembled relationship with said backing strip; said backing strip comprising a pair of elongate channel bodies arranged back to back, each channel body having an elongate side rail formed on each leg thereof and extending laterally outwardly of the channel body, the side rails on each channel body being co-planar, the distance between the outer longitudinal edges of the side rails formed on one channel body being greater than the distance between the outer longitudinal edges of the side rails formed on the other channel body, said squeegee element being alternatively receivable in one or the other of said channel bodies, the side rails on the unused channel body being slidably receivable between the opposed claws of a super-structure.

9. A refill unit according to claim 8 wherein the means for retaining the squeegee element in assembled relationship with the backing strip comprises a clip interlockingly engageable with the backing strip at each end thereof having a depending abutment blocking the end of a channel body for limiting longitudinal displacement of the squeegee element.

10. A refill unit according to claim 9 wherein said clip includes shoulders disposed adjacent the end portion of a side rail to limit longitudinal displacement of the refill unit relative to a wiper blade superstructure.

11. A refill unit according to claim 8 wherein said channel bodies each include a pair of legs extending in opposite directions from the junction therebetween, each of said pairs of legs terminating in opposed edges for retaining a squeegee element having a shouldered anchoring bead.

12. A refill unit according to claim 8 wherein said means for retaining the squeegee element in assembled relationship with the backing strip comprises a clip, said clip includes a pair of resilient flexible tabs terminating in lugs, said pair of tabs straddling the junction between said channel bodies, said opposed edges being notched said lugs engaging said notches whereby said tabs and lugs block a channel body for limiting longitudinal displacement of the squeegee element.

13. A refill unit according to claim 12 wherein said clip includes a pair of legs resiliently connected together by a web said legs overlying a pair of said side rails, at least one of said legs including a notch on its outer edge having opposed shoulders extending laterally beyond the outer edge of the corresponding side rails whereby said notch is resiliently and releasably engageable with a claw of a superstructure.

14. A refill unit according to claim 8 wherein the junction between said channel bodies is apertured adjacent an end, the refill unit including a clip for restraining said squeegee element against longitudinal displacement relative to said backing strip and for limiting longitudinal displacement of said refill unit relative to a superstructure, said clip comprising a channel for receiving a channel body and corresponding side rails therein, said channel having a web overlying the channel body, side walls terminating in inwardly directed opposed flanges embracing the side rails and an end wall, a portion of said web being cut away adjacent the open end of the channel to form a depending abutment for engaging the end of the squeegee element, the free ends of said side walls and flanages forming shoulders for engaging the claws of a superstructure, a resilient tab having a lug at its free end for releasable engagement with said aperture in said junction.

* * * * *

P,-1050
(5/69)

UNITED STATES PATENT OFFICE
CERTIFICATE OF CORRECTION

Patent No. 3,879,794     Dated April 29, 1975

Inventor(s) Hobart V. Roberts, Jr.

It is certified that error appears in the above-identified patent and that said Letters Patent are hereby corrected as shown below:

In the Abstract, Col. 2, line 11 -- "coplanar" should be --co-planar--. Col. 1, line 10 - "super-structure" should be --superstructure--.; line 26 - After "fit" "to sungly" should be --too snugly--. Col. 2, line 61 - After "pivoted", "to" should be --at--. Col. 3, line 2 - "super-structure" should be --superstructure--. Col. 8, line 5 - "super-structure" should be --superstructure--.

Signed and Sealed this

*ninth* Day of December 1975

[SEAL]

Attest:

RUTH C. MASON  
*Attesting Officer*

C. MARSHALL DANN  
*Commissioner of Patents and Trademarks*